(12) United States Patent
Gonno et al.

(10) Patent No.: US 7,627,881 B1
(45) Date of Patent: Dec. 1, 2009

(54) TRANSMITTING APPARATUS AND RECEIVING APPARATUS

(75) Inventors: Yoshihisa Gonno, Kanagawa (JP); Fumihiko Nishio, Tokyo (JP); Kazuo Haraoka, Tokyo (JP); Kazuhiko Takabayashi, Tokyo (JP); Yasuaki Yamagishi, Kanagawa (JP)

(73) Assignees: Sony Corporation, Tokyo (JP); Information Broadcasting Laboratories, Inc., Tokyo (JP)

( * ) Notice: Subject to any disclaimer, the term of this patent is extended or adjusted under 35 U.S.C. 154(b) by 0 days.

(21) Appl. No.: 09/647,332

(22) PCT Filed: Jan. 28, 2000

(86) PCT No.: PCT/JP00/00461

§ 371 (c)(1),
(2), (4) Date: Sep. 27, 2000

(87) PCT Pub. No.: WO00/45536

PCT Pub. Date: Aug. 3, 2000

(30) Foreign Application Priority Data

Jan. 29, 1999 (JP) ................................ 11-023220

(51) Int. Cl.
*G06F 3/00* (2006.01)
*G06F 13/00* (2006.01)
*G06F 15/16* (2006.01)
*H04N 5/445* (2006.01)
*H04N 7/173* (2006.01)

(52) U.S. Cl. ............................. 725/39; 725/44; 725/46; 725/47; 725/54; 725/114; 725/131; 709/217

(58) Field of Classification Search .................. 725/54, 725/44, 45, 46, 47, 39, 114, 131, 132, 133, 725/139, 140, 141, 151, 152, 153; 709/203, 709/217, 219
See application file for complete search history.

(56) References Cited

U.S. PATENT DOCUMENTS 5,930,493 A * 7/1999 Ottesen et al. ................. 725/92

(Continued)

FOREIGN PATENT DOCUMENTS

JP          10-187742          7/1998

OTHER PUBLICATIONS

Takako Hashimoto, et al., "Examination of restructured retrieval system enabling selective reading and listening of contents" Research Report, Information Processing Society of Japan, vol. 98, No. 58, Jul. 1998, p. 1-8.

(Continued)

*Primary Examiner*—Joseph G Ustaris
(74) *Attorney, Agent, or Firm*—Frommer Lawrence & Haug LLP; William S. Frommer; Thomas F. Presson

(57) ABSTRACT

A transmitting system for transmitting contents data, meta data, and meta data schema. A meta data schema that represents the structure of meta data of contents data is stored in a meta data schema storing portion. A contents segmenting portion generates segmentation data for selecting a particular segment from successive contents data supplied from a contents storing portion and supplies the generated segmentation data to a meta data combining portion. The meta data combining portion correlates meta data with corresponding segmentation data in a format corresponding to the structure of the meta data schema, combines the meta data with the segmentation data, and outputs the combined data. The meta data schema, meta data with segmentation data, and contents data are converted in a transmission format.

6 Claims, 11 Drawing Sheets

U.S. PATENT DOCUMENTS

| | | | |
|---|---|---|---|
| 5,978,043 A * | 11/1999 | Blonstein et al. | 348/569 |
| 6,005,561 A * | 12/1999 | Hawkins et al. | 715/500.1 |
| 6,025,837 A * | 2/2000 | Matthews et al. | 345/721 |
| 6,502,241 B1 * | 12/2002 | Kretz et al. | 725/52 |
| 6,530,083 B1 * | 3/2003 | Liebenow | 725/46 |
| 6,675,385 B1 * | 1/2004 | Wang | 725/39 |
| 6,898,762 B2 * | 5/2005 | Ellis et al. | 715/716 |

OTHER PUBLICATIONS

Toshikazu Owada, et al., "Examination of the index information fragmentation system for digital broadcasting" (in Japanese), Research report, Information Processing Society of Japan, vol. 98, No. 58, Jul. 1998, p. 17-24.

Yoshihisa Kenno, et al., "Technological Prospects for Information Broadcasting", Annual meeting in 1998, Image Information Media Society, Jul. 1998, p. 88-89.

Shigeo Sugimoto, "Digital Library", Computer Software, vol. 16, No. 1, Jan. 18, 1999, p. 57-63.

* cited by examiner

Fig. 5
```
<Service id = "Svc#1">
 <Event id = "E#5" start_time =20:00 duration=02:00>
  <Segment id="S#1" start_time=20:00 duration =00:20/>
  <Segment id="S#2" start_time=20:20 duration=01:20/>
  <Segment id="S#3" start_time=21:40 duration=00:20/>
  <Segment id="S#4" start_time=20:30 duration=00:20/>
  <Segment id="S#5" start_time=21:00 duration=00:30/>
  ......
 </Event>
</Service>
```
Fig. 6
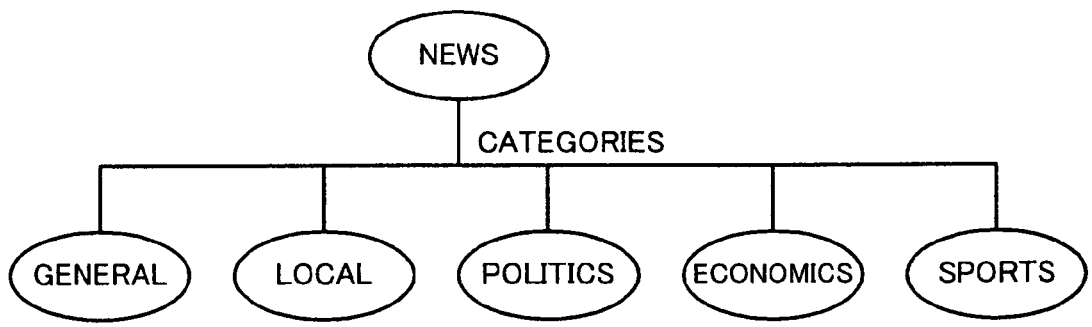
Fig. 7
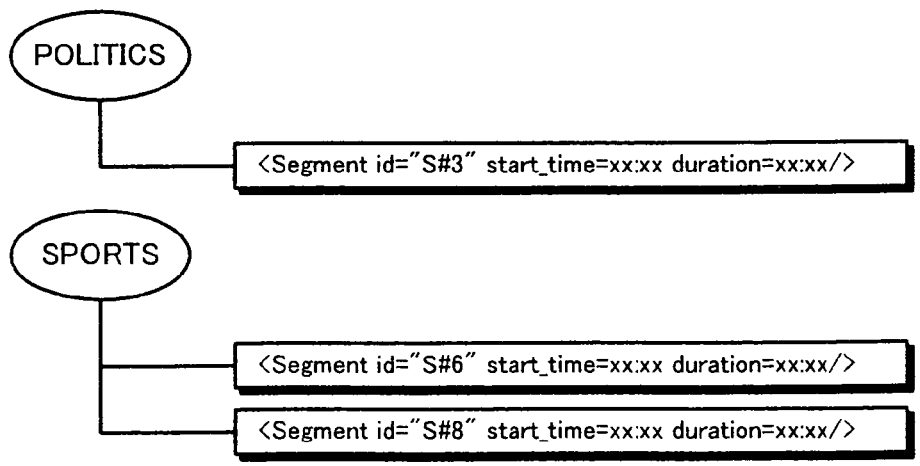

Fig. 11

..
<Segment ID="S#3" start_time=xx:xx duration=xx:xx/>
..
<Segment ID="S#5" start_time=xx:xx duration=xx:xx/>
..

Fig. 12

```
<Segment ID="S#3">
     <News:Category ID="Politics"/>
     <News:Area ID="Domestic"/>
</Segment>
<Segment ID="S#5">
     <News:Category ID="Sports"/>
     <News:Area ID="international"/>
</Segment>
```

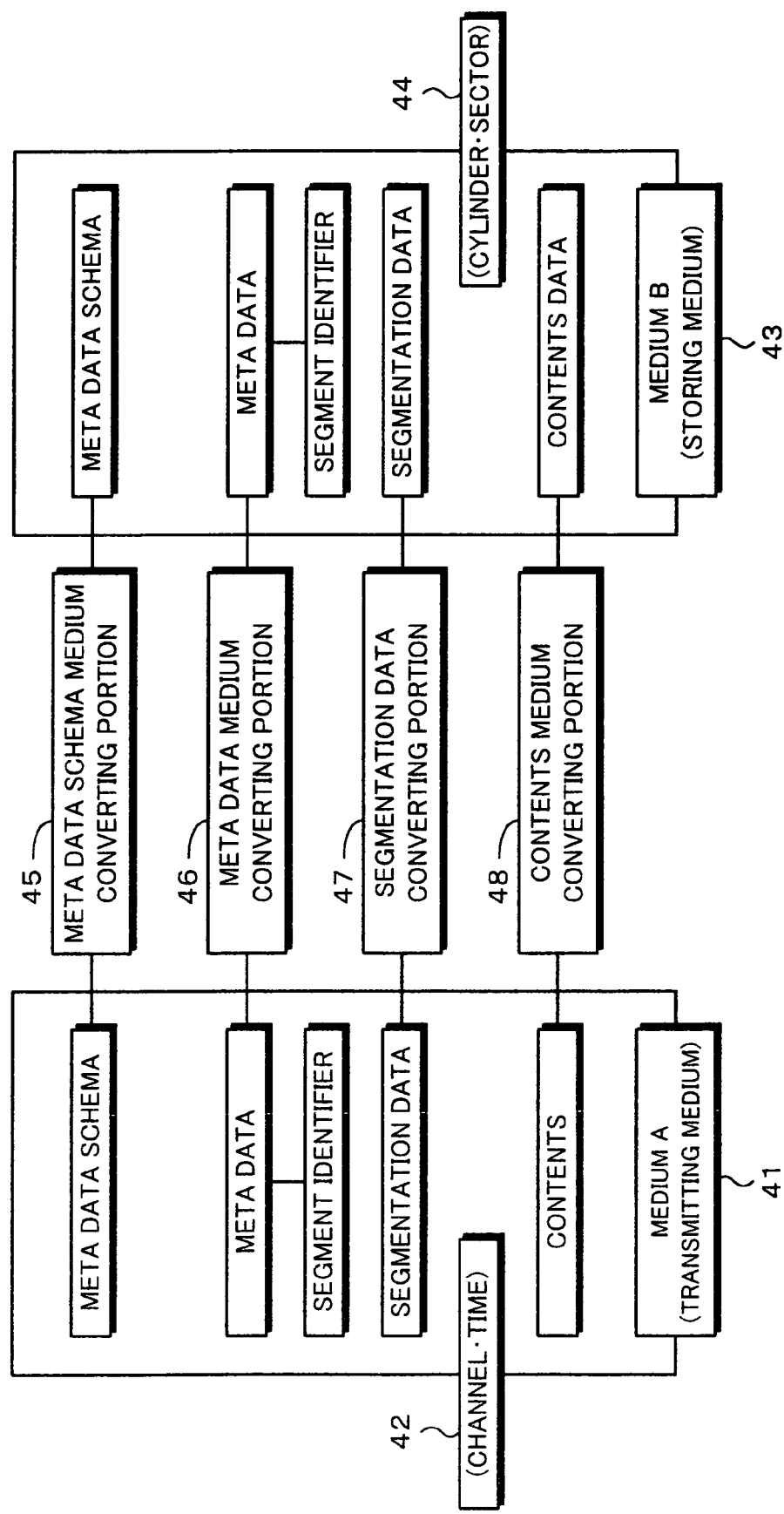

Fig. 14

```
<Service id="Svc#1">
    <Event id="E#5" start_time=20:00 duration=02:00>
        <Segment id="S#1" start_time=20:00 duration=00:20/>
        <Segment id="S#2" start_time=20:20 duration=01:20/>
        <Segment id="S#3" start_time=21:40 duration=00:20/>
        <Segment id="S#4" start_time=20:30 duration=00:20/>
        <Segment id="S#5" start_time=21:00 duration=00:30/>
        . . . . . .
    </Event>
</Service>
```

Fig. 15

```
<Drive id="D:">
    <File id="news.mp1" duration=02:00>
        <Segment id="S#1" start_time=00:00 duration=00:20/>
        <Segment id="S#2" start_time=00:20 duration=01:20/>
        <Segment id="S#3" start_time=01:40 duration=00:20/>
        <Segment id="S#4" start_time=00:30 duration=00:20/>
        <Segment id="S#5" start_time=01:00 duration=00:30/>
        . . . . . .
    </File>
</Drive>
```

Fig. 16

```
<Drive id="D:">
    <Segment id="S#1" resource="file:news1.mp1"/>
    <Segment id="S#2" resource="file:news2.mp1"/>
    <Segment id="S#3" resource="file:news3.mp1"/>
    <Segment id="S#4" resource="file:news4.mp1"/>
    <Segment id="S#5" resource="file:news5.mp1"/>
    . . . . . .
</Drive>
```

TRANSMITTING APPARATUS AND RECEIVING APPARATUS

TECHNICAL FIELD

The present invention relates to a transmitting apparatus and a receiving apparatus that are used in the field of a technology for delivering video/audio data to an infinite number of subscribers and that allow desired data to be effectively selected from a large amount of successive data so as to receive, store, and browse the selected data.

RELATED ART

Many techniques have been proposed as data delivering systems. For example, on the Internet, data is delivered using WWW (World Wide Web) corresponding to HTTP (Hyper Text Transfer Protocol). To retrieve desired data from a huge amount of data collection of WWW (World Wide Web), the use of meta data is becoming common. The meta data contains a data structure. As an example of systems that selectively receive data corresponding to meta data from WWW, PICS (Platform for Internet Content Selection) and RDF (Resource Description Framework) have been proposed.

In a digital broadcast, meta data such as a program title and broadcast time data that are structural elements of EPG (Electronic Program Guide) is transmitted in the format of EIT (Event Information Table). Information of EPG is represented as a section type table or the like referred to as SI (Service Information). A receiver extracts relevant information from the table and displays the extracted information on its screen. With EPG, the user can select data as programs from successive broadcast data.

Although a digital broadcast is mono-directionally transmitted to a very large number of terminal units, a large amount of data can be simultaneously transmitted. Thus, it is advantageous to merge a digital broadcast and a network. In reality, meta data is added to contents data on the Internet or contents data of a digital broadcast.

The format of meta data of a digital broadcast (for example, EIT) is not compatible with the format of meta data of a conventional network such as the Internet. To solve this problem, both types of meta data are used as they are. However, in a system using WWW such as PICS or RDF, since meta data is represented in a text format, the transmission efficiency is not high. In addition, to selectively receive meta data through a broad band broadcast network, the receiver side should filter received data at high speed. However, in the text format, it is difficult to filter received data at high speed.

On the other hand, meta data such as EIT of a digital broadcast has a dedicated format. The meta data is transmitted using predetermined descriptors. In other words, a converting method for converting meta data such as EIT into data corresponding to WWW has not been defined. In addition, a method for transmitting flexible meta data such as PICS or RDF corresponding to the MPEG system used in a digital broadcast and a format that represents meta data have not been defined.

To solve these problems, a method for converting such meta data in a format suitable for a digital broadcast has been proposed in a prior patent application (Japanese Patent Application No. Hei 10-170397). In other words, in the prior patent application, as with EPG, meta data corresponding to a RDF model is represented as a section type table referred to as SI.

When contents data on a network such as the Internet is communicated as a digital broadcast, contents data on the network is shorter than contents data of the digital broadcast. Thus, it is preferred to use meta data that is shorter than that of each program. Meta data of EIT of a digital broadcast is used to select successive data of each program. In other words, it is difficult to represent meta data for partial data and the relation of meta data of partial data. Thus, it cannot be said that meta data for a digital broadcast is suitable for representing contents data on the network.

The user can temporarily store contents data of a digital broadcast. When necessary, the user can retrieve contents data from a storage medium and reproduce the retrieved contents data. In this case, using meta data of each program, the user cannot arrange the structure of programs corresponding to his or her favorite. In addition, when a storage medium is changed, segmentation information cannot be used.

DISCLOSURE OF THE INVENTION

Therefore, an object of the present invention is to provide a transmitting apparatus and a receiving apparatus that allow data to be effectively delivered and flexibly and selectively received corresponding to a user's favorite in such a manner that contents data is segmented and meta data is correlated with any partial data.

To accomplish the above-described object, the present invention is a transmitting apparatus for providing contents data composed of successive data, comprising a meta data schema storing means for storing the data structure of meta data of the contents data, a contents segmenting means for generating segmentation information of the contents data, a meta data combining means for correlating the segmentation information of the contents data with the meta data, a meta data converting means for converting the meta data with the segmentation data combined by said meta data combining means in a transmission format, a meta data schema converting means for converting the meta data schema stored in said meta data schema storing means in the transmission format, and a transmitting means for transmitting the meta data with the segmentation information in the transmission format, the meta data schema in the transmission format, and the contents data through a transmission path.

In addition, the present invention is a transmitting apparatus for providing contents data composed of successive data, comprising a meta data schema storing means for storing the data structure of meta data of the contents data, a contents segmenting means for generating segmentation information of the contents data, a segmentation information storing means for storing the segmentation information of the contents data, a meta data combining means for correlating an identifier of the segmentation information with the meta data, a meta data converting means for converting the meta data with the identifier combined by said meta data combining means in a transmission format, a meta data schema converting means for converting the meta data schema stored in said meta data schema storing means in the transmission format, a segmentation information converting means for converting the segmentation information stored in said segmentation information storing means in the transmission format, and a transmitting means for transmitting the meta data with the identifier in the transmission format, the meta data schema in the transmission format, the segmentation information, and the contents data through a transmission path.

In addition, the present invention is a receiving apparatus for presenting contents data composed of successive data, comprising a meta data schema storing means for storing the data structure of meta data of the contents data, a meta data storing means for storing meta data with segmentation information of the contents data, a user profile operating means for operating user's favorite information, a meta data analyzing means for collating the meta data schema, the meta data, and the user profile, a contents reproduction controlling means for controlling the reproduction of the contents data corresponding to segmentation information that is output from said meta data analyzing means, a receiving means for receiving meta data with segmentation information in a transmission format, a meta data schema in the transmission format, and contents data through a transmission path, a meta data schema restoring means for restoring the meta data schema in the transmission format into meta data schema in a storage format of said meta data schema storing means, and a meta data restoring means for restoring the meta data with the segmentation information in the transmission format into meta data with segmentation information in a storage format of said meta data storing means.

In addition, the present invention is a receiving apparatus for presenting contents data composed of successive data, comprising a meta data schema storing means for storing the data structure of meta data of the contents data, a meta data storing means for storing meta data with an identifier of segmentation information of the contents data, a segmentation information storing means for storing the segmentation information, a user profile operating means for operating user's favorite information, a meta data analyzing means for collating the meta data schema, the meta data, and the user profile, a contents reproduction controlling means for controlling the reproduction of the contents data corresponding to segmentation information that is output from said meta data analyzing means, a receiving means for receiving meta data with the identifier in a transmission format, a meta data schema in the transmission format, segmentation information in the transmission format, and contents data through a transmission path, a meta data schema restoring means for restoring the meta data schema in the transmission format into meta data schema in a storage format of said meta data schema storing means, a meta data restoring means for restoring the meta data with the identifier in the transmission format into meta data with an identifier in a storage format of said meta data storing means, and a segmentation information restoring means for restoring the segmentation information in the transmission format into segmentation information in a storage format of said segmentation information storing means.

As described above, according to the present invention, since segmentation information of contents data is correlated with meta data and the resultant data is delivered, any segments of successive data can be restructured as contents data corresponding to a user's favorite. Thus, data can be effectively delivered and flexibly and selectively received. In addition, segmentation information and meta data are represented using RDF and XML (Extensible Markup Language) in WWW. The resultant data is converted in a suitable transmission format such as the MPEG-2 format or IP format. Thus, meta data can be more flexibly delivered.

BRIEF DESCRIPTION OF DRAWINGS

FIG. 5 is a schematic diagram for explaining segmentation data according to the embodiment of the present invention;

FIG. 6 is a schematic diagram for explaining a meta data schema according to the embodiment of the present invention;

FIG. 7 is a schematic diagram for explaining meta data with segmentation data according to the embodiment of the present invention;

FIG. 11 is a schematic diagram for explaining segmentation data according to the other embodiment of the present invention;

FIG. 12 is a schematic diagram for explaining meta data according to the other embodiment of the present invention;

FIG. 13 is a block diagram for explaining a medium converting process according to the other embodiment of the present invention;

FIG. 14 is a schematic diagram showing an example of segmentation data according to the other embodiment of the present invention;

FIG. 15 is a schematic diagram showing another example of segmentation data according to the other embodiment of the present invention; and FIG. 16 is a schematic diagram showing a further example of segmentation data according to the other embodiment of the present invention.

BEST MODES FOR CARRYING OUT THE INVENTION

Figure 1:
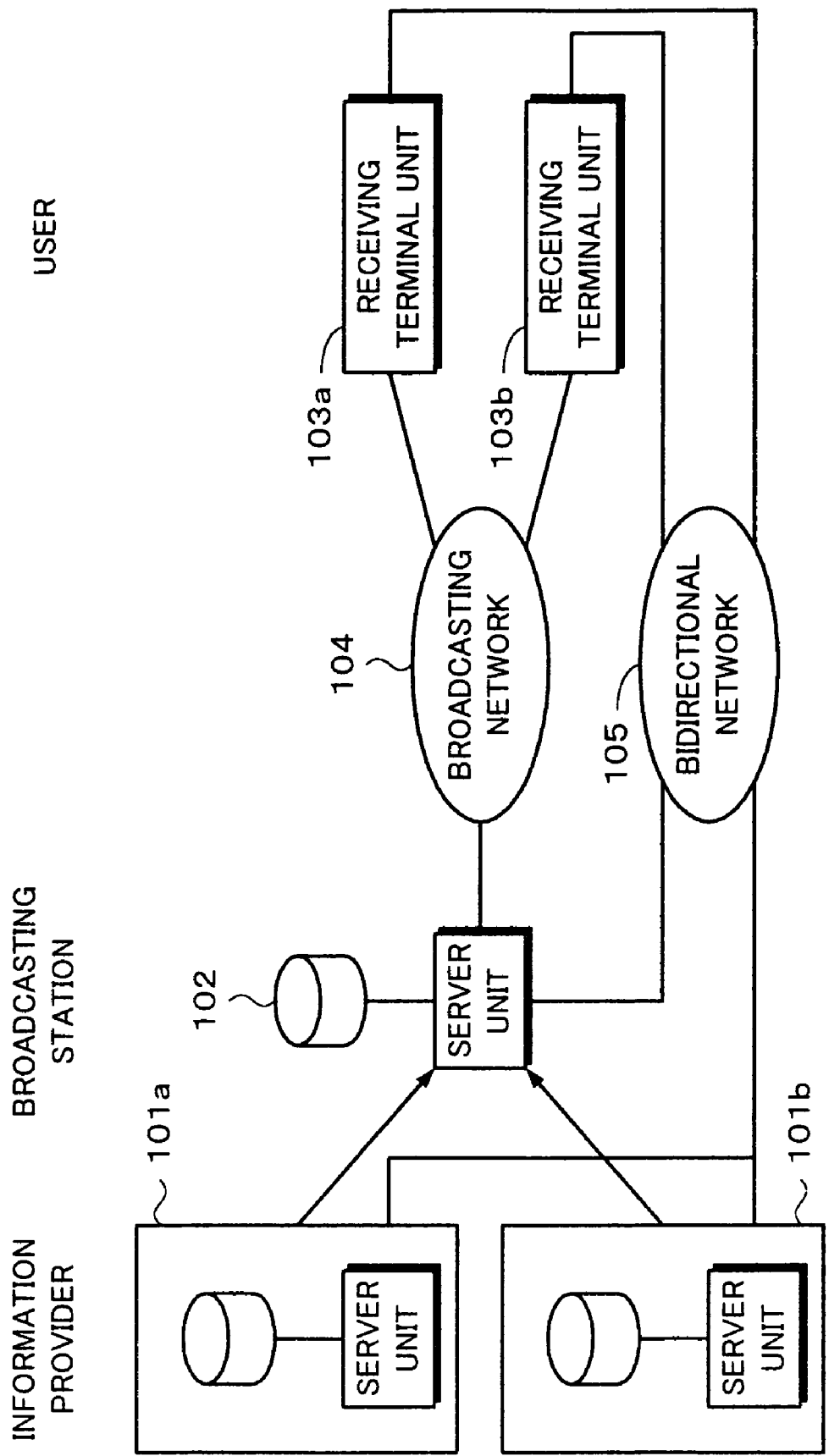
FIG. 1 is a block diagram showing a communication system according to the present invention.

Next, an embodiment of the present invention will be described. FIG. 1 shows an example of the structure of a contents delivering system according to the present invention. Information providers 101a and 101b each have a database. The database stores contents data, a meta information schema that represents the structures of meta information of the contents data, and meta information corresponding to the contents data. The contents data is for example WWW pages. The information providers 101a and 101b are connected to a broadcasting station 102 and receiving terminal units 103a and 103b through a bidirectional network 105. The information provider 101 can supply contents data, a meta data schema, and meta data to the receiving terminal units 103a and 103b through the bidirectional network 105.

The broadcasting station 102 has a database that stores contents data, a meta information schema that represents the structure of meta information of the contents data, and meta information corresponding to the contents data. The contents data is for example broadcast programs. The broadcasting station 102 is connected to the receiving terminal units 103a and 103b through a broadcasting network 104. The broadcasting station 102 can supply contents data, a meta information schema, and meta information to the receiving terminal units 103a and 103b. In addition, the broadcasting station 102 can receive contents data, a meta information schema, and meta information from the information provider 101 through the bidirectional network and deliver them to the receiving terminal unit 103 through the broadcasting network 104.

Figure 2:
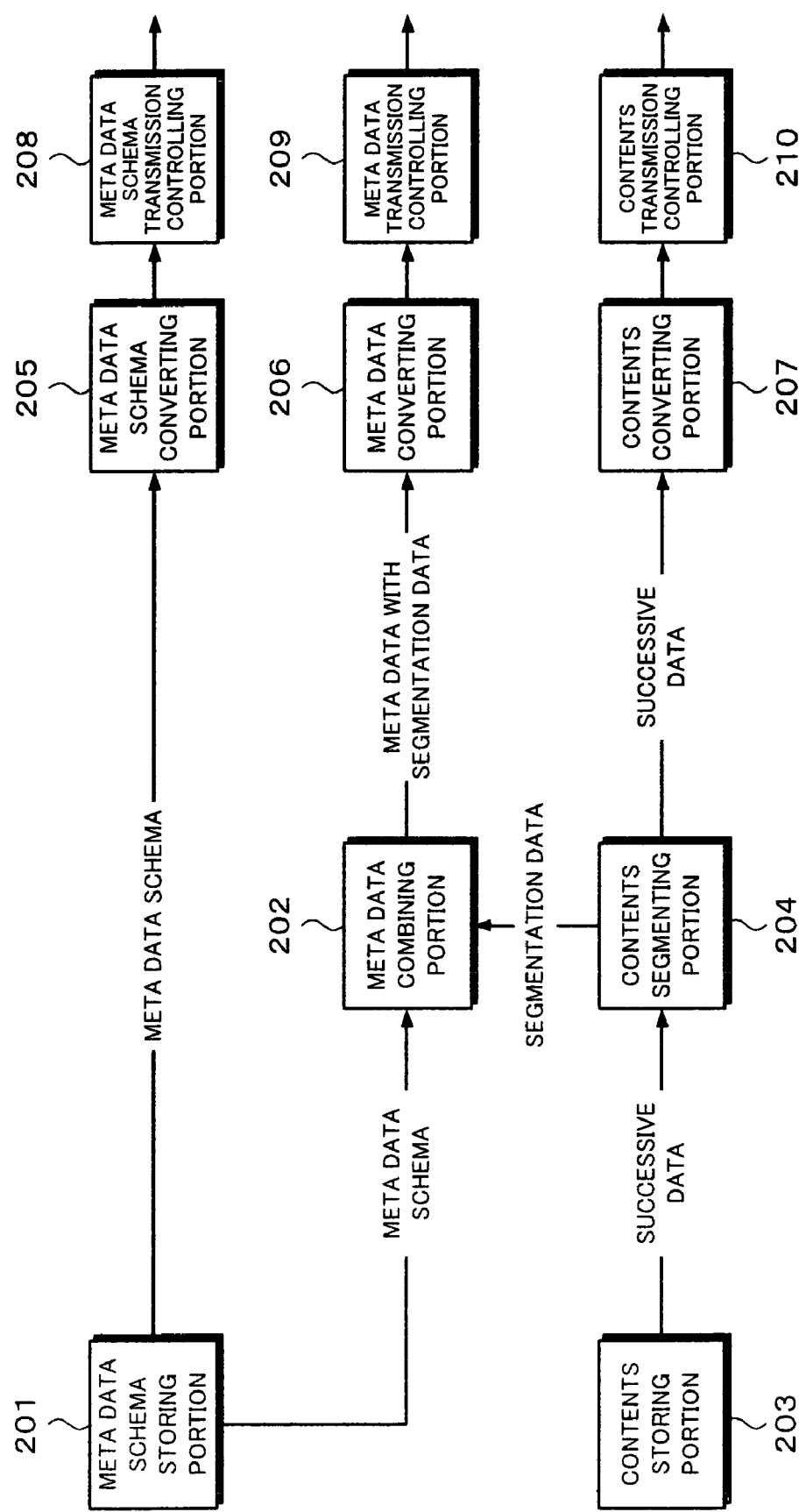
FIG. 2 is a block diagram showing an example of a broadcasting station according to the embodiment of the present invention.

FIG. 2 shows an example of the structure of the broadcasting station 102. A contents storing portion 203 stores contents data supplied to the receiving terminal units 103a and 103b. Contents data provided by the information providers 101a and 101b may be temporarily stored to the contents storing portion 203. As with a live program, when contents data is broadcast while it is being produced, the contents storing portion 203 may be a cache for temporarily storing contents data that is monitored.

A meta data schema storing portion 201 stores a meta data schema that represents the structure of meta data for contents data stored in the contents storing portion 203. A meta data schema defines the structure of information that is added to program data. The information added to the program data is for example "program title", "program genre", "broadcast time", and "parental guide". The number of meta data schemas stored in the meta data schema storing portion 201 is not limited to one. A meta data schemas is identified by a meta data schema identifier.

When contents data is a television program, "program name", "program genre", and "parental guide" are added thereto as meta data. When contents data is a data broadcast, "program name", "program genre", and "applicable OS" are added thereto as meta data. Since the structure of meta data added to contents data varies for each contents data or year by year, there may be a plurality of meta data schemas. Before meta data is transmitted, a meta data schema that represents the structure thereof is transmitted to a receiving apparatus through the bidirectional network or the broadcasting network so that the meta data schema can be updated.

A contents segmenting portion 204 generates segmentation data for selecting a particular segment from successive data supplied from the contents storing portion 203 and supplies the segmentation data to a meta data combining portion 202. The meta data combining portion 202 correlates meta data of a particular segment of successive data with the segmentation data corresponding to the structure of the meta data schema, combines the meta data and the segmentation data, and outputs meta data with segmentation data.

For example, as meta data of a particular program or meta data of a segment of a program, segmentation data that identifies the program or the segment is output. In the case that a program is a segment, segmentation data is added to meta data of "program title: seven o'clock news" and "genre: news" and output as meta data with segmentation data. In the case of a segment of a program, segmentation data is added to meta data of "genre of news: politics" and output as meta data with segmentation data. The output data of the meta data combining portion 202 also contains an identifier of the meta data schema of the meta data. In reality, as segmentation data, "start time" and "end time" of the segment or "start time" and "duration" of the segment can be represented in combination.

A meta data schema converting portion 205 converts a meta data schema stored in a meta data schema storing portion 203 in a transmission format. Although the descriptive format of a schema stored in the meta data schema storing portion 203 may vary for each contents data or for each information provider, the meta data schema converting portion 205 converts the format of a meta data schema into one transmission format. In this case, various types of transmission formats can be used. For example, a meta data schema can be represented in an MPEG system section format. The other meta data and segmentation data can be represented in the similar format.

A meta data converting portion 206 converts meta data with segmentation data generated by the meta data combining portion 204 in the transmission format. The descriptive format of meta data combined by the meta data combining portion 204 may vary for each contents data or each information provider. However, the meta data converting portion 206 converts the format of meta data into one transmission format. A contents converting portion 207 converts contents data of successive data in the transmission format.

A meta data schema transmission controlling portion 208, a meta data transmission controlling portion 209, and a contents transmission controlling portion 210 control the transmissions of a meta data schema, meta data with segmentation data, and contents data that have been converted in the transmission format against a transmission path. In the case of the broadcasting network 104, it is supposed that the transmission path for a meta data schema, meta data with segmentation data, and contents data is a line corresponding to MPEG-2 system or IP multi-cast. In the case of the bidirectional network 105, it is supposed that the transmission path is a line corresponding to IP (Internet Protocol) or ATM (Asynchronous Transfer Mode).

In the broadcasting station, a communication controlling portion is disposed (not shown in FIG. 2). The communication controlling portion is connected to the bidirectional network 105. The communication controlling portion receives requests for a meta data schema, meta data, and contents data from the receiving terminal units 103a and 103b, retrieves a meta data schema, meta data, and contents data corresponding to the requests, and supplies them to the receiving terminal units 103a and 103b. The structure of each of the information providers 101a and 101b is the same as the structure of the broadcasting station 102 except that the former does not have a transmitting portion that transmits data to the broadcasting network.

Figure 3:
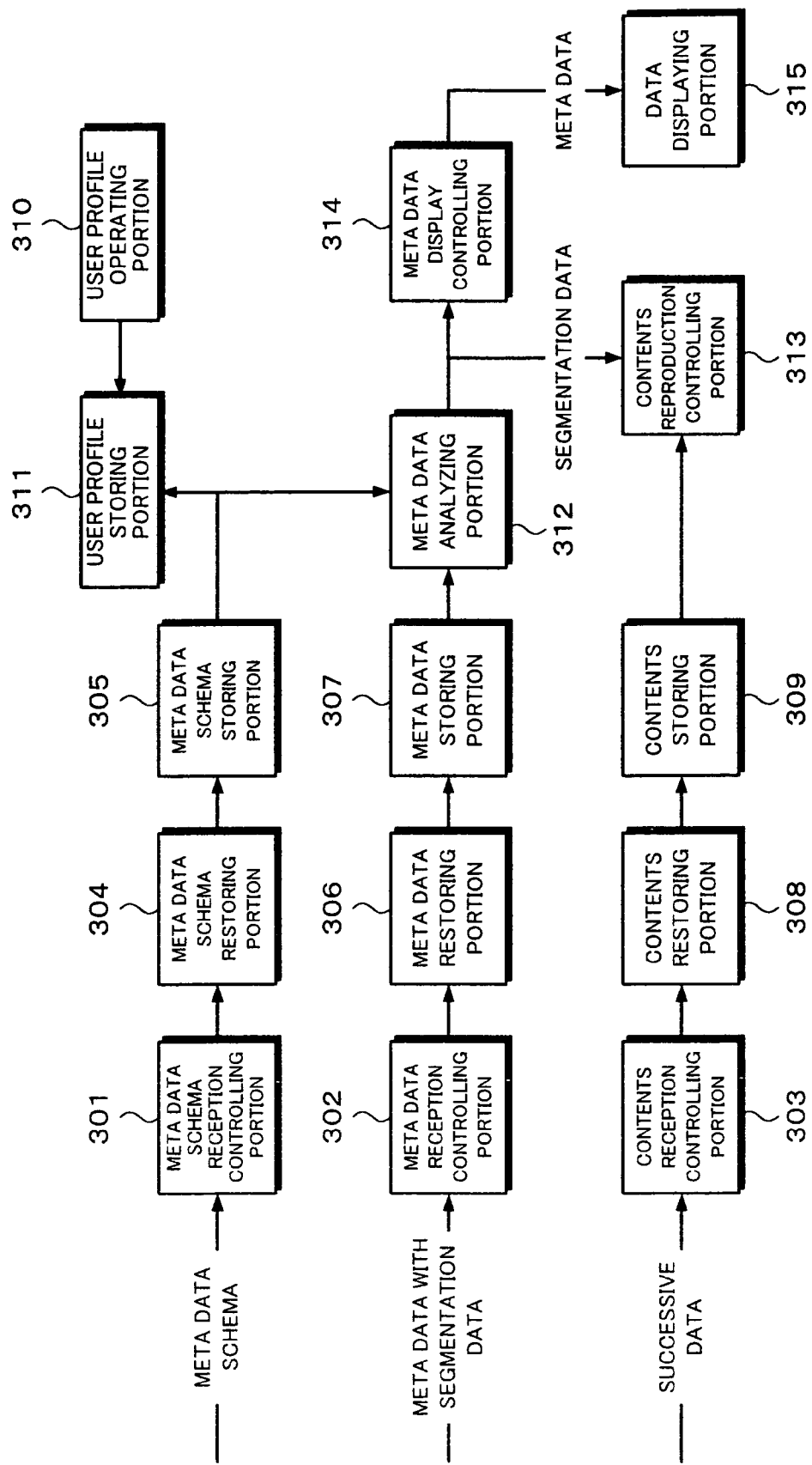
FIG. 3 is a block diagram showing an example of a receiving terminal unit according to the embodiment of the present invention.

FIG. 3 shows an example of the structure of a receiving terminal unit. A meta data schema reception controlling portion 301, a meta data reception controlling portion 302, and a contents reception controlling portion 303 control the receptions of a meta data schema, meta data with segmentation data, and contents data that are transmitted through the network.

The received meta data schema is supplied to a meta data schema restoring portion 304. The meta data schema restoring portion 304 restores the received meta data schema in a format so that the terminal unit can easily use the meta data schema. The restored meta data schema is stored to a meta data schema storing portion 305. The received meta data with segmentation data is supplied to a meta data restoring portion 306. The meta data restoring portion 306 restores the received meta data with segmentation data in a format so that the terminal unit can easily use the meta data with segmentation data. The restored meta data with segmentation data is stored to a meta data storing portion 307.

The received contents data is supplied to a contents restoring portion 308. The contents restoring portion 308 restores the received contents data in a format so that the terminal unit can easily use the contents data. The restored contents data is stored to a contents storing portion 309.

The user of the receiving terminal unit references the meta information schema stored in the meta information schema storing portion 305 with a user profile operating portion 310, generates user unique profile information, and stores the user unique profile information to a user profile storing portion 311.

A meta data analyzing portion 312 selects only meta data corresponding to the meta data schema stored in the meta data schema storing portion 305 and to the user unique profile information stored in the user profile storing portion 311.

Corresponding to the segmentation information contained in the selected meta data, a contents reproduction controlling portion 313 restructures segments of the successive data. A data displaying portion 315 displays the resultant contents data. On the other hand, a meta data display controlling portion 314 controls the meta data displayed on the data displaying portion 315. When a communication controlling portion (not shown) is disposed in the receiving terminal unit, a meta information schema, meta information, and contents data can be requested and received through the bidirectional network 105.

Figure 4:
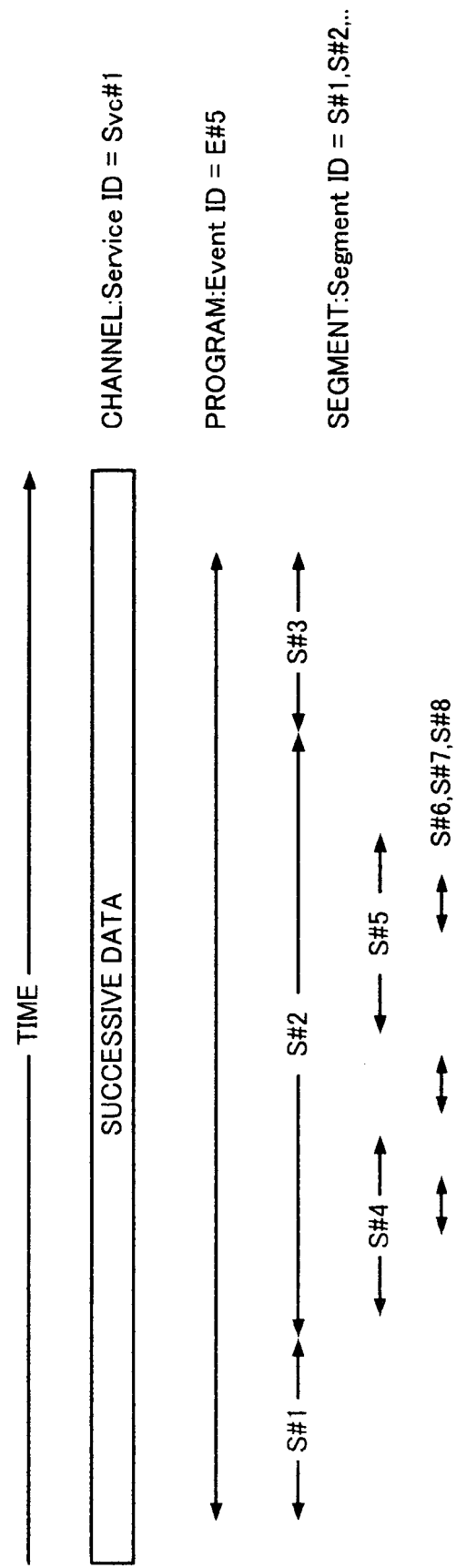
FIG. 4 is a schematic diagram for explaining a segmentation according to the embodiment of the present invention.

Next, the embodiment of the present invention will be described in more detail. FIG. 4 explains meta data and segmentation data. In FIG. 4, successive data of a program with a channel identifier of Service ID=Svc #1 is shown. In the case of a digital broadcast, a program identifier, for example Event ID=E#5, is added. Such successive data is segmented into for example eight segments. The eight segments are assigned segment identifiers ID=S#1, S#2, . . . .

As shown in FIG. 5, in successive data, each segment is identified with parameters such as segmentation data composed of start time and duration thereof as well as the above-described segment ID. The time data is defined in an MPEG-2 stream.

FIG. 6 shows an example of a meta data schema. When a news program is composed of three segments with segment IDs=S#1, S#2, and S#3, it is assumed that the segments are categorized as general, local, politics, economics, and sports. FIG. 7 shows an example of which segmentation data is added to the politics category and the sports category of a news program.

As was described with reference to FIG. 3, when the terminal unit receives meta data with segmentation data, the terminal unit can control the reproduction of contents data corresponding to the segmentation data. Thus, the terminal unit can restructure any segments of the successive data as contents data corresponding to a user's favorite. Thus, data can be effectively delivered and flexibly and selectively received. In addition, segmentation information and meta data are represented using RDF and XML (Extensible Markup Language) in WWW. The resultant data is converted in a suitable transmission format such as the MPEG-2 format or IP format. Thus, meta data can be more flexibly delivered.

Next, another embodiment of the present invention will be described. In the above-described embodiment, segmentation data is added to meta data. However, in the other embodiment, parameters of segmentation data are transmitted separately from meta data. In other words, parameters of segmentation data are represented separately from meta data.

Figure 8:
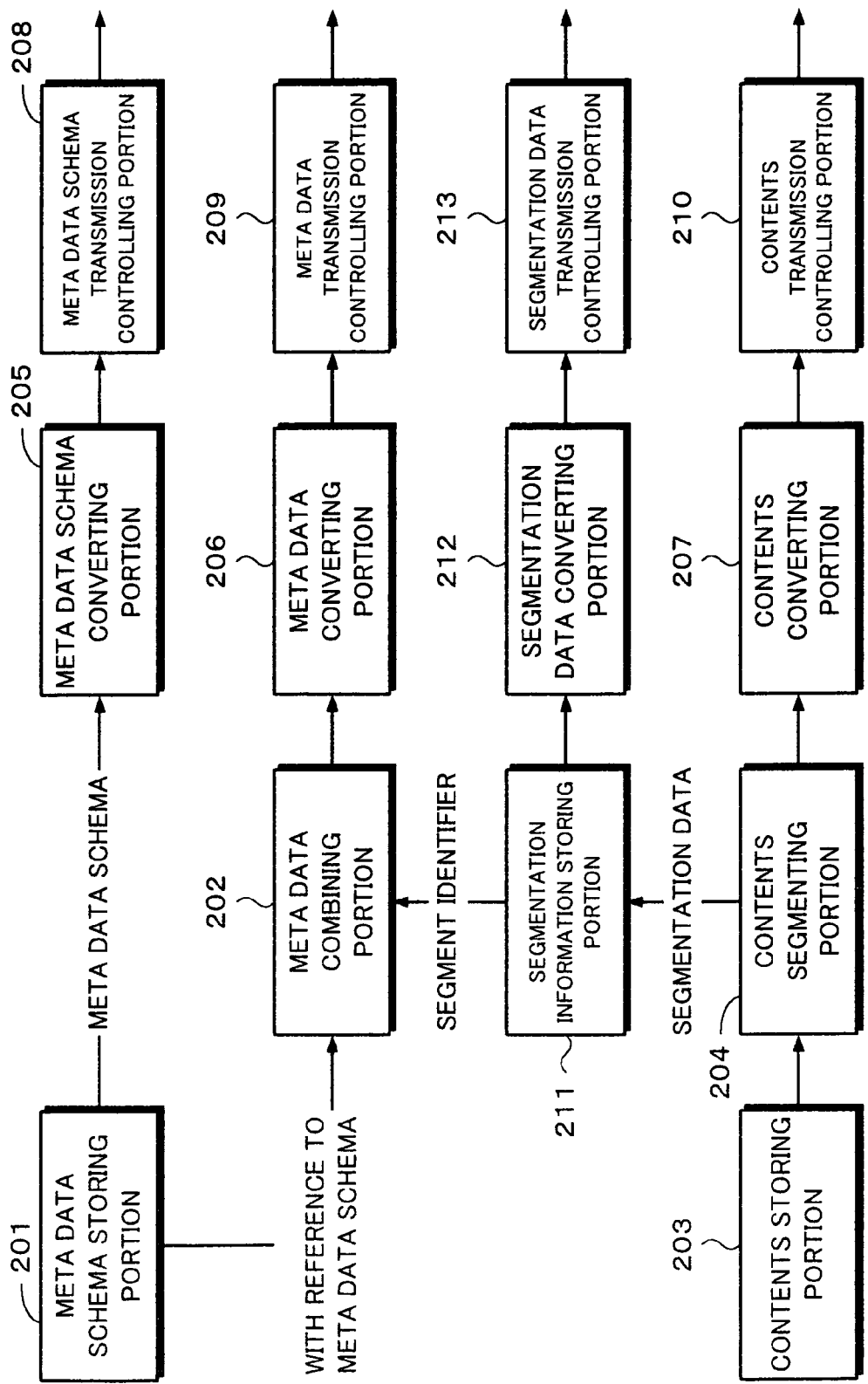
FIG. 8 is a block diagram showing an example of a broadcasting station according to another embodiment of the present invention.

FIG. 8 shows an example of the structure of a broadcasting station according to the other embodiment. In FIG. 8, similar portions to those in the structure of the broadcasting station of the above-described embodiment (shown in FIG. 2) are denoted by similar reference numerals and their description is omitted. In the other embodiment, a segmentation data storing portion 211 is disposed. As with the above-described embodiment, a contents segmenting portion 204 generates segmentation data for selecting a particular segment from successive data that is supplied from a contents storing portion 203. The segmentation data is supplied to a segmentation data storing portion 211.

The segmentation data storing portion 211 stores parameters for identifying a particular segment along with a segment identifier for identifying a particular segment of contents data. The parameters are for example start time and duration or start time and end time of a segment. The segment identifier is supplied to a meta data combining portion 202.

The meta data combining portion 202 correlates meta data of a particular segment of successive data corresponding to the segment identifier with segmentation data in the format corresponding to the structure of the meta data schema, combines them as meta data with a segment identifier, and outputs it.

For example, as meta data of a particular program or meta data of a segment of a program, a segment identifier for identifying the program or the segment is output. In the case that a program is a segment, a segment identifier is added to meta data "program title: seven o'clock news" and "program genre: news" and the resultant data is output. In the case of a segment of a program, a segment identifier is added to meta data for example "news genre: politics" and the resultant data is output. The output data contains an identifier of a meta data schema corresponding to the meta data.

Meta data with a segment identifier that is output from the meta data combining portion 202 is processed in the same manner as the above-described embodiment. Likewise, a meta data schema and contents data are processed in the same manner as the above-described embodiment. Segmentation data that is supplied from the segmentation data storing portion 211 is supplied to a segmentation data transmission controlling portion 213 through a segmentation data converting portion 212. The segmentation data converting portion 212 converts the segmentation data stored in the segmentation data storing portion 211 in a transmission format. Although the descriptive format may vary for each contents data or each information provider, the segmentation data converting portion 212 converts the segmentation data in one transmission format. In this case, various types of transmission formats can be used. For example, data can be represented in an MPEG system section format.

A meta data schema transmission controlling portion 208, a meta data transmission controlling portion 209, a contents transmission controlling portion 210, and a segmentation data transmission controlling portion 213 control the transmissions of the meta data schema, meta data with the segment identifier, contents data, and segmentation data converted in the transmission format against the transmission path.

Figure 9:
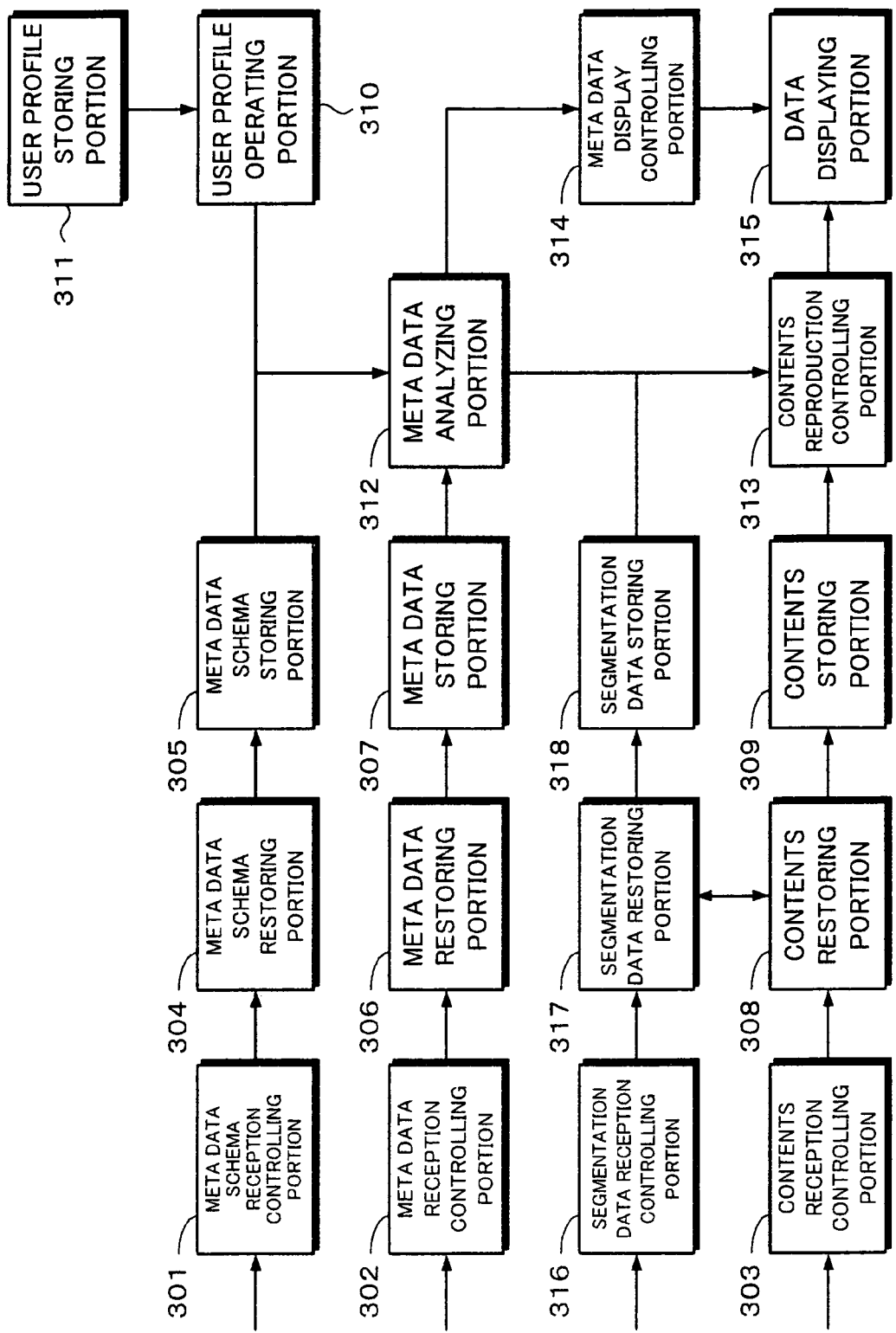
FIG. 9 is a block diagram showing an example of a receiving terminal unit according to the other embodiment of the present invention.

FIG. 9 shows an example of the structure of a receiving terminal unit according to the other embodiment of the present invention. In FIG. 9, similar portions to those in the structure of the receiving terminal unit according to the above-described embodiment of the present invention (shown in FIG. 3) are denoted by similar reference numerals and their description is omitted. In the receiving terminal unit according to the other embodiment, a segmentation data reception controlling portion 316 is disposed. The segmentation data reception controlling portion 316 controls the reception of segmentation data transmitted through the network.

Received segmentation data is supplied to a segmentation data restoring portion 317. The segmentation data restoring portion 317 restores the received segmentation data in a format so that the terminal unit can easily use the segmentation data. The restored segmentation data is stored to a segmentation data storing portion 318.

Corresponding to the segmentation identifier of the selected meta data and the segmentation data stored in the segmentation data storing portion 318, a contents reproduction controlling portion 313 restructures segments of the successive data. A data displaying portion 315 displays the resultant contents data. On the other hand, a meta data display controlling portion 314 controls the meta data displayed on the data displaying portion 315. When a communication controlling portion (not shown) is disposed, a meta data schema, meta data, segmentation data, and contents data can be requested and received through the bidirectional network 105.

Figure 10:
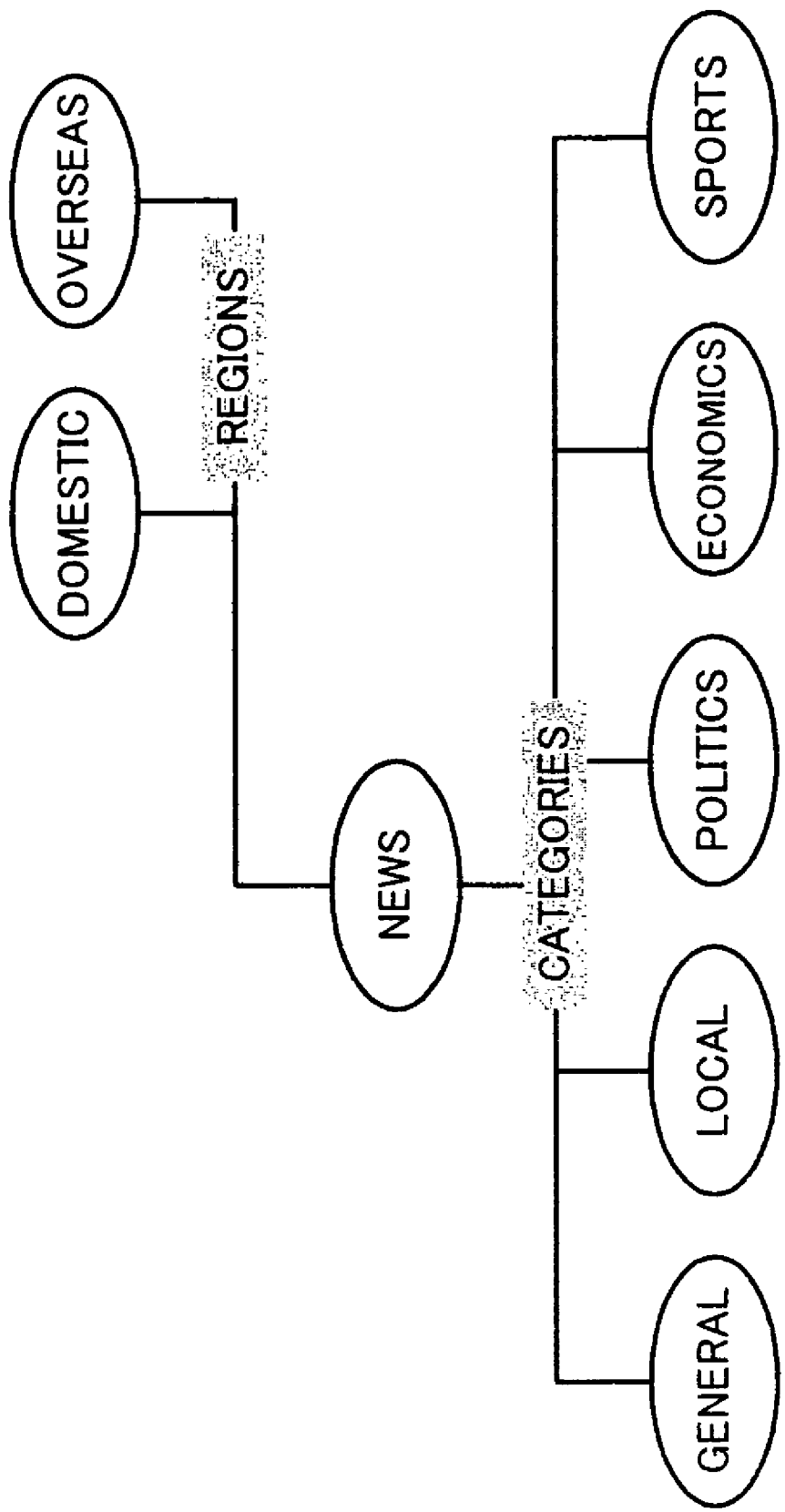
FIG. 10 is a schematic diagram for explaining a meta data schema according to the other embodiment of the present invention.

Next, the other embodiment of the present invention will be further described. FIG. 10 shows an example of a meta data schema. When the genre of contents data is a news program, it is categorized as general, local, politics, economics, and sports. In addition, the news is classified as domestic and overseas. In this case, segmentation data is shown in FIG. 11. As shown in FIG. 11, segmentation data of each segment is composed of a segment identifier and parameters. FIG. 12 shows an example of meta data corresponding to a meta data schema shown in FIG. 10. In the other embodiment, a segment identifier is added to meta data and the resultant data is transmitted.

According to the other embodiment, since segmentation data is represented independently from meta data and they are separately transmitted, a segment of contents data of different mediums can be identified with the same identifier. FIG. 13 shows the structure of a medium conversion between a transmitting medium 41 and a storing medium 43 that are different mediums. In the transmitting medium 41, a program is normally identified with information of channel and time 42. On the other hand, in the storing medium 43, the position on the medium is normally defined with information of cylinder and sector 44.

To exchange data according to the other embodiment between the medium 41 and the medium 43, converting portions 45, 46, 47, and 48 are disposed therebetween. The converting portion 45 converts a meta data schema in a suitable format corresponding to a medium. The converting portion 46 converts meta data in a suitable format corresponding to a medium. The converting portion 47 converts segmentation data in a suitable format corresponding to a medium. The converting portion 48 converts contents data in a suitable format corresponding to a medium. In addition to converting the descriptive format of segmentation data, the segmentation data converting portion 47 converts parameters of segmentation data corresponding to the descriptive format of a segment of contents data identified by the converted descriptive format of the segmentation data.

In this case, in the segment identifier, only parameters are converted in a suitable format corresponding to a medium. FIGS. 14, 15, and 16 show examples of segmentation data. FIG. 14 shows an example of which the medium 41 is a digital broadcast of which channel identifier Service ID=Svc #1 and Event ID=E#5. FIG. 15 shows an expression of segmentation data in the case that events shown in FIG. 14 are stored to one file of which the medium 42 is a hard disk and of which drive ID=D and file name=news mpl. FIG. 16 shows an expression of segmentation data in the case that the events shown in FIG. 14 are successively stored to files of which the medium 42 is a hard disk and of which drive ID=D and file name=news mpl.

According to the present invention, with segmentation data, the reproduction of contents data can be controlled. Thus, any segments of successive data can be restructured as contents data corresponding to a user's favorite. Thus, data can be effectively delivered and flexibly and selectively received. In addition, segmentation information and meta data are represented using RDF/XML in WWW. The resultant data is converted in a suitable transmission format such as the MPEG-2 format or IP format. Thus, meta data can be more flexibly delivered. Moreover, according to the present invention, since segmentation data is separately represented and transmitted, segmentation information can be stored and used between different mediums.

The invention claimed is:

1. A transmitting apparatus for transmitting contents data and corresponding meta data over a network, comprising:

contents storing means for storing contents data comprising broadcast programs and corresponding meta data in a broadcast format;

meta data schema storing means for storing a meta data schema defining a data structure for said meta data that is compatible with a network transmission format;

contents segmenting means for segmenting said contents data and generating segmentation information of the contents data;

contents converting means for converting the segmented contents data into said network transmission format;

meta data combining means for combining the corresponding meta data and segmentation information for the segmented contents data corresponding to the meta data schema;

meta data converting means for converting the meta data and segmentation information from the broadcast format into the network transmission format, wherein the broadcast programs are restructured by a user based on the segmentation information, the meta data schema and the meta data being transferred according to the restructured broadcast programs, and wherein the meta data schema is transmitted to a receiving apparatus and updated by the receiving apparatus according to a user's favorite before the meta data is transmitted so that the meta data of each segmented contents data is selectively delivered based on the updated meta data schema, and wherein said meta data converting means converts the meta data with the segmentation information and represents the meta data with the segmentation information in a descriptor format of an MPEG system section;

meta data schema converting means for converting the meta data schema into the network transmission format; and transmitting means for transmitting the converted meta data and segmentation information, the converted meta data schema, and the converted contents data in the network transmission format over the network.

2. The transmitting apparatus as set forth in claim 1, wherein said meta data schema converting means converts the meta data schema and represents the meta data schema in an MPEG system section format.

3. A transmitting apparatus for transmitting contents data and corresponding meta data over a network, comprising:

contents storing means for storing contents data comprising broadcast programs and corresponding meta data in a broadcast format;

meta data schema storing means for storing a meta data schema defining a data structure for said meta data that is compatible with a network transmission format;

contents segmenting means for segmenting said contents data and generating segmentation information of the contents data;

contents converting means for converting the segmented contents data into said network transmission format;

segmentation information storing means for storing the segmentation information of the contents data;

meta data combining means for correlating an identifier of the segmentation information with the corresponding meta data for the segmented contents data, the corresponding meta data being combined with the segmented contents data corresponding to the meta data schema;

meta data converting means for converting the meta data and identifier into the network transmission format, wherein said meta data converting means converts the meta data with the segmentation information and represents the meta data with the segmentation information in a descriptor format of an MPEG system section;

meta data schema converting means for converting the meta data schema from the broadcast format into the network transmission format;

segmentation information converting means for converting the segmentation information into the network transmission format; and transmitting means for transmitting the converted meta data and identifier, the converted meta data schema, the converted segmentation information, and the converted contents data in the network transmission format over the network, wherein the broadcast programs are restructured by a user based on the segmentation information, the meta data schema and the meta data being transferred according to the restructured broadcast programs, and wherein the meta data schema is transmitted to a receiving apparatus and updated by the receiving apparatus according to a user's favorite before the meta data is transmitted so that the meta data of each segmented contents data is selectively delivered based on the updated meta data schema.

4. The transmitting apparatus as set forth in claim 3, wherein said meta data schema converting means converts the meta data schema and represents the meta data schema in an MPEG system section format.

5. A receiving apparatus for receiving contents data and corresponding meta data transmitted over a network, comprising:

receiving means for receiving segmented contents data comprising broadcast programs, corresponding meta data and segmentation information, and a meta data schema in a network transmission format from the network, the corresponding meta data being combined with the segmented contents data corresponding to the meta data schema, wherein said corresponding meta data includes electronic program guide data converted for transmission from a broadcast transmission format into said network transmission format, and wherein said meta data with said segmentation information is represented in a descriptor format of an MPEG system section;

meta data schema storing means for storing the received meta data schema defining a data structure for the corresponding meta data;

meta data storing means for storing the received meta data and segmentation information corresponding to the segmented contents data;

meta data analyzing means for analyzing the stored meta data and segmentation information on the basis of the meta data schema; and contents reproduction controlling means for controlling reproduction of the segmented contents data on the basis of the segmentation information analyzed by said meta data analyzing means, wherein the broadcast programs are restructured by a user based on the segmentation information, the meta data schema and the meta data being transferred according to the restructured broadcast programs, and wherein the receiving apparatus updates the meta data schema according to a user's favorite and transmits the updated meta data schema to a transmitting apparatus before receiving the meta data so that the meta data of each segmented contents data is selectively delivered based on the updated meta data schema.

6. A receiving apparatus for receiving contents data and corresponding meta data transmitted over a network, comprising:

receiving means for receiving segmented contents data comprising broadcast programs, corresponding meta data and an identifier, segmentation information, and a meta data schema in a network transmission format from the network, the corresponding meta data being combined with the segmented contents data corresponding to the meta data schema, wherein said corresponding meta data includes electronic program guide data converted for transmission from a broadcast transmission format into said network transmission format, and wherein said meta data with said segmentation information is represented in a descriptor format of an MPEG system section;

meta data schema storing means for storing the received meta data schema defining a data structure for the corresponding meta data;

meta data storing means for storing the received meta data and identifier corresponding to the segmentation information for the contents data;

segmentation information storing means for storing the received segmentation information;

meta data analyzing means for analyzing the stored meta data on the basis of the meta data schema, and the stored segmentation information on the basis of the identifier; and contents reproduction controlling means for controlling reproduction of the segmented contents data on the basis of the segmentation information analyzed by said meta data analyzing means, wherein the broadcast programs are restructured by a user based on the segmentation information, the meta data schema and the meta data being transferred according to the restructured broadcast programs, and wherein the receiving apparatus updates the meta data schema according to a user's favorite and transmits the updated meta data schema to a transmitting apparatus before receiving the meta data so that the meta data of each segmented contents data is selectively delivered based on the updated meta data schema.

* * * * *